United States Patent Office 3,247,235
Patented Apr. 19, 1966

3,247,235
METHOD OF MAKING DIALKYLALUMINUM CYANIDES
Robert Ehrlich, 490 Sussex Ave., Morristown, and Archie R. Young II, 18 Franklin Place, Montclair, N.J.
No Drawing. Filed Feb. 11, 1963, Ser. No. 257,799
7 Claims. (Cl. 260—448)

This invention concerns novel organo aluminum compounds and to a process of preparing them.

More particularly this invention relates to dialkylaluminum cyanides useful as gelling agents, intermediates in organic chemistry, propellant chemistry and as monomers which can be polymerized to form propellant binders. These novel compounds are included within the structure:

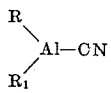

wherein R and $R_1$ which can be the same or different are alkyl radicals having from 1–8 carbon atoms, aligned as a straight chain or a branched chain joined or conjoined.

Illustrative compounds intended to be within the scope of this invention include among others the compositions where the alkyl groups are the same such as dimethylaluminum cyanide, diethylaluminum cyanide and dibutylaluminum cyanide; compositions where the alkyl group are different such as methylethylaluminum cyanide, ethylpropylaluminum cyanide and methylbutylaluminum cyanide; as well as branched chain compositions such as diisopropylaluminum cyanide, diisobutylaluminum cyanide and diisopropylisobutylaluminum cyanide; including these compositions where the carbon atoms are joined to form a ring such as dicyclopropylaluminum cyanide and dicyclohexylaluminum cyanide.

In its composition aspects the compounds of this invention are advantageous in several respects. For example they exhibit the unusual characteristic of increasing the viscosity of various non-aqueous solvents to the point of gelation. Illustration of the solvents which can be used for this purpose are the ketones such as acetone, methyl ethyl ketone, diethyl ketone and cyclic ethers such as tetrahydrofuran. The gelation ability of these compositions is valuable in several respects. For example, the compositions can be used to suspend or disperse water insoluble pesticidal chemicals including herbicides and fungicides in organic solvents thus avoiding the need to prepare water soluble salts and derivatives. Another more esoteric use of the compounds of this invention is as a binder in the preparation of solid propellant compositions. Binders in solid propellants serve several important functions including the assurance of a compacted homogeneous propellant mixture. The good oxygen stability of the compositions is another attractive aspect of their use as both gelation and binding agents.

Another advantage of the novel compositions of this invention is their value as polymer precursors. The compounds can be used as comonomers with aluminum hydride to form N-alkylalazenes which are useful polymers.

The dialkylaluminum cyanides of this invention can be prepared by two different processes. One process involves the reaction of a dialkylalane (alternatively known as a dialkylaluminum hydride) with hydrogen cyanide. The reaction is as shown below:

(1) 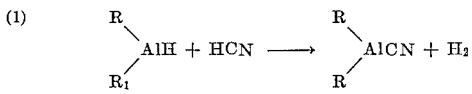

The reaction is rapid and is uncomplicated by side reactions. The yields are good and the evolution of hydrogen assures the irreversibility of the reaction. While no solvent is needed to run the reaction by this process the presence of an inert tertiary amine solvent tends to minimize polymerization of the easily polymerized product. Good results have been obtained when $(C_2H_5)_3N$ has been used as the solvent. The product obtained is of low molecular weight and insoluble in aromatics such as benzene. Peculiarly enough, if the reaction is run in the absence of the tertiary amine but with the inert solvent present, the product is a higher molecular weight polymer soluble in aromatics. This high molecular weight polymer of the product possesses the unusual propensity of causing gelation in cyclic ethers or ketones in comparatively low concentrations. While no mechanism is postulated to explain the formation of the polymer it is assumed that a coordination polymer is formed by similar mechanisms to those reported for certain nitriles.

The second process which can be used to prepare the dialkylaluminum cyanides of this invention is the reaction between a dialkylaluminum halide and a metal cyanide such as the alkali metal cyanides or alkaline earth cyanides. Again as in the first process described supra the process is free from competing side reactions and takes place rapidly. The action for the second process is as follows:

(2) 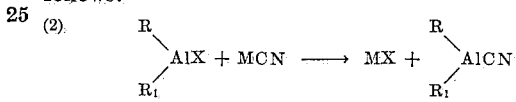

wherein R and $R_1$ have the values as previously assigned to them, M is a metallic cation and X is a halogen. Especially preferred are the alkali metal cyanides such as lithium, sodium and potassium.

Both processes are relatively flexible insofar as reaction conditions are concerned. The operable reaction temperatures are between —10 and 160° C. with the narrower range —10 to 50° C. being preferred. When hydrogen cyanide is used as the reactant, temperatures above 20° C. promote too vigorous a reaction and are to be avoided. On the other hand, reaction temperatures below —10° C. unduly prolong the reaction time and are inconvenient. The processes of this invention can be operated at pressures ranging from sub to superatmospheric. Subatmospheric pressures offer little advantage while superatmospheric allow a reduction of the reaction temperatures. Based upon experimental trial the processes of this invention are preferably operated at substantially atmospheric pressure. In both processes a slight excess over the stoichiometric amount of cyanide is used to assure completion of the reaction. The reaction time is a variable factor dependent upon several experimental varients including the reactants, pressure and operating temperature. Under the preferred temperature range of 0 to 50° C. and the preferred pressure, times ranging between ¼ hours to 20 days represent the extremes of time, while 1 hour to 3 days are more usual. The lower dialkylaluminum halide reactants, particularly the chlorides, are commercially available. The preparation of the higher dialkylaluminum halides can be made in an analogous manner using procedures well known in synthetic organic chemistry. Similarly, the lower dialkylaluminum hydrides are commercially available or can be made by the known reaction of a dialkylaluminum halide with an alkali metal hydride, as described by Ziegler et al. among others in the technical literature.

To illustrate the preparation and utilization of the compounds of this invention in more detail, the following illustrative examples are submitted.

*Example 1.—Preparation of dimethylaluminum cyanide*

The reaction is run in a conveniently sized reaction vessel fitted with a Dewar condenser, a vacuum adapter, a source of agitation and an inert gas inlet. The Dewar condenser is kept at −10° C. during the reaction. To the reaction vessel is added a 1.4 parts by weight portion of anhydrous hydrogen cyanide (free from $CO_2$), followed by 21 parts by weight of anhydrous benzene. The reaction vessel is filled with nitrogen and allowed to reach 0° C. A solution of 3.9 parts by weight of dimethylalane in 21 parts of anhydrous benzene is added dropwise to the agitated benzene-hydrogen cyanide solution. The reaction is immediate and vigorous and the solution turns yellow. After all the dimethylalane solution is added the temperature is allowed to reach room temperature and the yellow solution is freed from the benzene solvent by evaporation under a strong vacuum. A 316 parts by weight portion of deep yellow crystals is obtained melting at 68–66° C. The identity of the product as dimethylaluminum cyanide is confirmed by the elemental analysis and the infrared spectrum. The latter shows no Al—H or HCN absorption but rather a strong C≡N absorption at 4.52μ. The cryoscopic molecular weight of the polymer in benzene is 660. The value calculated for $(C_3H_6NAl)_8$ is 664 indicating close experimental agreement.

*Example 2.—Preparation of diethylaluminum cyanide by the metallic cyanide method*

To a suspension of 6.2 parts by weight of anhydrous sodium cyanide in 80 parts by weight of anhydrous benzene is added with stirring a solution of 10 parts by weight of methylaluminum chloride in 200 parts by weight of anhydrous benzene. The reaction mixture is kept under nitrogen and heated to 70° C. for 15 days. At this time, the solution is deep yellow and gives a negative chloride test. The insoluble sodium chloride and excess sodium cyanide is filtered off and the product in the benzene solution concentrated by freeze drying. The product obtained consisted of 10.14 parts by weight of yellow syrupy diethylaluminum cyanide. The C≡N absorption in the infrared appeared at 4.53μ. This together with the elemental analysis confirmed the identity of the product as diethylaluminum cyanide.

*Examples 3–5.—Preparation of other dialkylaluminum cyanides*

Using the same procedure as described in Example 1 but the following higher homologues of dimethylaluminum cyanide the following compounds are prepared:

| Example | Reactant | Product |
|---|---|---|
| 3 | Dipropylaluminum hydride. | Dipropylaluminum Cyanide. |
| 4 | Dibutylaluminum hydride. | Dibutylaluminum Cyanide. |
| 5 | Dihexylaluminum hydride. | Dihexylaluminum Cyanide. |

In each instance the infrared spectrum showed an absence of the Al—H and HCN absorption spectrum and a strong C≡N absorption around 4.50μ.

*Example 6.—Gelation of tetrahydrofuran and acetone*

Duplicate samples of each of the four preparations of Examples 1, 3, 4 and 5 is added to separate 250 ml. beakers making a total of 8 samples. To 4 of the beakers is added with stirring reagent grade acetone and to the other 4 is added reagent grade tetrahydrofuran. Sufficient solvent is added in each instance to produce 10% by weight solutions of the dialkylaluminum cyanide products in the solvents. Within ½ hour of the addition of solvent the solutions set to form a firm gel which cannot be dislodged by inverting the beakers. The gels appear to have long term stability.

We claim:
1. The process of preparing dialkylaluminum cyanides of the structure:

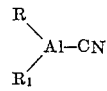

wherein R and $R_1$ are alkyl radicals having from 1–8 carbon atoms, which comprises the step of contacting hydrogen cyanide with a dialkylaluminum hydride of the structure:

until substantially all the hydrogen is evolved from the hydride.
2. The process of claim 1 wherein the R and $R_1$ are methyl.
3. The process of claim 1 wherein the R and $R_1$ are ethyl.
4. The process of claim 1 wherein the R and $R_1$ are propyl.
5. The process of claim 1 wherein the R and $R_1$ are isopropyl.
6. The process of claim 1 wherein R and $R_1$ are pentyl.
7. The process of claim 1 wherein R and $R_1$ are hexyl.

References Cited by the Examiner

UNITED STATES PATENTS 3,078,263  2/1963  Stearns _____ 260—94.3

OTHER REFERENCES

Zeiss: Organometallic Chemistry, Reinhold Publishing Corporation, New York, 1960, pages 205 to 206.

TOBIAS E. LEVOW, *Primary Examiner.*

CARL D. QUARFORTH, *Examiner.*